United States Patent [19]

Sterzel et al.

[11] Patent Number: 5,342,561
[45] Date of Patent: Aug. 30, 1994

[54] THERMOPLASTIC PROCESSING OF UNPLASTIFIABLE POLYMERS

[75] Inventors: Hans-Josef Sterzel, Dannstadt-Schauernheim; Marion Meyer, Mannheim, both of Fed. Rep. of Germany

[73] Assignee: BASF Aktiengesellschaft, Ludwigshafen, Fed. Rep. of Germany

[21] Appl. No.: 888,719

[22] Filed: May 27, 1992

[30] Foreign Application Priority Data

Jun. 4, 1991 [DE] Fed. Rep. of Germany ....... 4118277

[51] Int. Cl.$^5$ .............................................. B29C 67/20
[52] U.S. Cl. .......................................... 264/49; 264/83; 264/126
[58] Field of Search ................. 264/83, 112, 115, 117, 264/126, 49

[56] References Cited

U.S. PATENT DOCUMENTS

| | | |
|---|---|---|
| 3,917,761 | 11/1975 | Scheuerlein et al. ............... 264/41 |
| 4,265,794 | 5/1981 | Pett et al. ............................ 264/126 |
| 4,671,912 | 6/1987 | Komatsu et al. ...................... 264/63 |

FOREIGN PATENT DOCUMENTS 0114746 8/1984 European Pat. Off. .
4021741 1/1992 Fed. Rep. of Germany .

*Primary Examiner*—Allan R. Kuhns
*Attorney, Agent, or Firm*—Keil & Weinkauf

[57] ABSTRACT

A process for thermoplastic processing and sintering an unplastifiable polymer comprises dispersing the unplastifiable polymer in powder form in a melt of a polyacetal or a mixture of polyacetals, cooling the resulting mixture, granulating it, forwarding the granules to a thermoplastic processing stage, injection or extrusion molding, exposing the molding to an atmosphere which contains an acidic gas, thereby de-polymerizing the polyacetal, enveloping the remaining porous molding on all sides in a gas/liquid-impermeable film, heating in an autoclave, and isostatically sintering the molding with pressure from all sides to form the finished article.

10 Claims, No Drawings

THERMOPLASTIC PROCESSING OF UNPLASTIFIABLE POLYMERS

Polymeric materials have come to be used in a great variety of ways in all branches of industry. Especially thermoplastic materials have achieved rapid market penetration by virtue of their ease of processing. For instance, injection molding permits mass production of complicated shapes without any need for reworking. Extrusion molding makes it possible to produce sheets and complex profiles.

There are other polymers which have advantageous properties but which unfortunately cannot be processed like thermoplastics. Such polymers can only be sintered from the powder state at elevated temperature and pressure to form simple shapes such as disks or rods or plates. The semi-finished shapes thus obtained are then machined to obtain the actual shaped articles in a complicated manner.

There is a large group of wholly aromatic polymers notable for combining high stiffness, strength, nonflammability, chemical resistance, stress cracking resistance and high temperature resistance which for example are not amenable to thermoplastic processing. Examples are polyamides of terephthalic or isophthalic acid and para- or meta-phenylene diamine, polyimides, polyesters of p-hydroxybenzoic acid, poly-p-phenylene, polybenzothiazoles, polythiazoles, polyimidazoles, polybenzimidazoles, polyoxadiazoles, polybisbenzoxazoles, polyoxazoles, polybenzoxazoles or polyquinoxalines.

At most, they can only be spun into fibers from solutions.

It is an object of the present invention to make polymers which have hitherto not been amenable to thermoplastic processing amenable to injection molding for the mass production of complex shapes and to extrusion molding for the production of sheets or profiles.

We have found that this object is achieved by dispersing the pulverulent polymers in a melt of a polyacetal or a mixture of polyacetals, cooling the resulting mixture and granulating it, forwarding the granules into an injection or extrusion molding machine, and obtaining the desired moldings by injection molding or extrusion through dies. Thereafter the moldings are exposed at from 100° to 150° C. to an atmosphere which contains an acidic gas to depolymerize the polyacetal to give formaldehyde, which escapes from the piece.

The remaining porous molding is enveloped on all sides with a gas-tight envelope and then sintered at elevated temperature under gas or liquid pressure with volume shrinkage to give the finished molding.

In what follows, the invention will be described in detail.

To produce moldings from inorganic materials it is known to mix a ceramic or metal powder with a thermoplastic resin, molding the mixture into a preform, removing the thermoplastic resin and then sintering this porous preform to obtain the actual molded article. The thermoplastic resin or binder used is for example polystyrene, polypropylene, polyethylene or an ethylene-vinyl acetate copolymer. These binders are removed from the preform by heating to 300° to 550° C. for 3-8 hours, during which the binders are pyrolyzed. Heating to these temperatures must be carried out very carefully and slowly to avoid damaging the preform through uncontrolled decomposition of the organic substance and the attendant cracking. For this reason the heatup rate should be only 4° C./hour. U.S. Pat. No. 4,671,912 recommends even lower heatup rates of 1°-2° C./hour, at least until half the binder has been removed. These long heatup periods of several days do much to make this process economically unattractive.

To shorten the heatup times, EP-B-115 104 recommends using as the binder a mixture of oxidized paraffin wax or an oxidized microcrystalline wax with a higher fatty acid. In EP-B-114 746, the binder proposed is a polyacetal.

These processes, which involve the use of thermoplastics or waxes, all have the disadvantage that, to achieve pyrolyric removal of the binder, the preform must be heated to temperatures above the softening point of the binder, so that the risk of deformation is ever present.

Nor would such processes be usable for the thermoplastic processing of the polymer powders, since the pyrolyric removal of the binder requires temperatures of up to 550° C.—temperatures at which the polymer powders decompose.

However, it is also known to remove the binder from the preform not by pyrolysis but by extraction with a solvent. In JP-A2-62/278160 the solvent used is supercritical carbon dioxide at 60° C. and 200 kg/cm$^2$ and in EP-B-206 685 liquid carbon dioxide at from −30° C. to 31.1° C. However, special apparatus is required for carrying out these processes.

Against that background, a process has been disclosed (O.Z. 41 722) which makes it possible to remove the binder phase from the preform molding rapidly and without the above-described disadvantages. There the binder used is a polyacetal which, by treating the molding with an atmosphere which contains nitric acid, boron trifluoride or boron trifluoride adducts at 100°–150° C., is depolymerized without leaving a residue.

The polyacetal used can be not only a homopolymer but also a copolymer of polyoxymethylene having a molecular weight of from 25,000 to 75,000. The term copolymer refers to the polymers of trioxane with, for example, ethylene oxide, 1,3-dioxolane or 1,3-dioxepane, which can be present in amounts of, for example, 2–8% by weight.

However, if pure polyoxymethylene having a low comonomer content is used as binder in the production of injection moldings having relatively thick walls, a problem arises due to the high rate of crystallization of the polyoxymethylene; the melt solidifies at the wall of the usually cooled injection mold more rapidly than in the interior, i.e. the inside of the molding crystallizes later than the outside. As the process of crystallization is accompanied by a contraction in volume, cracks appear on the inside of the molding, since the already rigidified outer parts can no longer partake in the shrinkage process.

This disadvantage does not arise if instead of a single polyoxymethylene having a low comonomer content a mixture of two different polyacetals B1 and B2 is used, of which B1) comprises from 70 to 90, preferably from 80 to 88, % by weight of a polyoxymethylene homopolymer or of a polyoxymethylene copolymer with not more than 10, preferably from 2 to 7, mol % of comonomer units and B2) comprises from 10 to 30, preferably from 10 to 25, in particular from 12 to 20, % by weight of a polyoxymethylene copolymer having a comonomer content of from 20 to 99, preferably from 25 to 95, in particular from 25 to 80, mol %, of 1,3-dioxolane, 1,3-dioxane or 1,3-dioxepane or a mixture thereof.

Such polyoxymethylene homopolymers and copolymers are known per se to the person skilled in the art and are described in the literature.

The homopolymers are in general prepared by polymerizing formaldehyde or trioxane, preferably in the presence of suitable catalysts.

Polyoxymethylene copolymers B1) and B2) which are preferred for the purposes of the present invention, besides the repeat unit —OCH$_2$—, contain repeat units of the formula

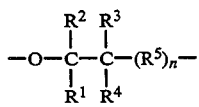

where each of $R^1$ to $R^4$ is independently of the others hydrogen, $C_1$-$C_4$-alkyl or haloalkyl of 1–4 carbon atoms, $R^5$ is —CH$_2$—, —CH$_2$O—, $C_1$-$C_4$-alkyl- or $C_1$-$C_4$-haloalkyl-substituted methylene or similar oxymethylene, and n is 0–3. Advantageously, these groups can be introduced into the copolymers by ring opening of cyclic ethers. Preferred cyclic ethers are those of the formula

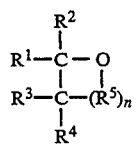

where $R^1$–$R^5$ and n are each as defined above. Examples of cyclic ethers are ethylene oxide, 1,2-propylene oxide, 1,2-butylene oxide, 1,3-butylene oxide, 1,3-dioxane, 1,3-dioxolane and dioxepane, and examples of comonomers are linear oligo- or polyformals such as polydioxolane or polydioxepane.

In principle, the polyoxymethylene copolymers B1) and B2) may contain the same repeat units, differing only in the proportion thereof.

Other suitable components B1) and B2) are oxymethylene terpolymers, prepared for example by reacting trioxane, one of the above-described cyclic ethers and a third monomer, preferably a bifunctional compound of the formula

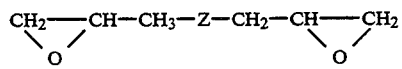

where Z is a chemical bond, —O— or —ORO—(R=-$C_1$-$C_8$-alkylene or $C_2$-$C_8$-cycloalkylene).

Preferred monomers of this kind are ethylene diglycide, diglycidyl ether and diethers of glycidyls and formaldehyde, dioxane or trioxane in a molar ratio of 2:1 and also diethers of 2 mol of glycidyl compound and 1 mol of an aliphatic diol of 2–8 carbon atoms, for example the diglycidyl ethers of ethylene glycol, 1,4-butanediol, 1,3-butanediol, 1,3-cyclobutanediol, 1,2-propanediol and 1,4-cyclohexanediol, to name but a few.

Processes for preparing the above-described homopolymers and copolymers are known to the person skilled in the art and are described in the literature, making further details superfluous here.

The preferred polyoxymethylene homopolymers and copolymers have melting points of at least 150° C. and weight average molecular weights within the range from 5,000 to 150,000, preferably from 7,000 to 60,000.

Other suitable components B2) are poly-1,3-dioxolane —O—CH$_2$—O—CH$_2$—CH$_2$—, poly-1,3-dioxane —O—CH$_2$—O—CH$_2$—CH$_2$—CH$_2$— and poly-1,3-dioxepane —O—CH$_2$—O—CH$_2$—CH$_2$—CH$_2$—CH$_2$— or mixtures thereof with one another or with polyoxymethylene copolymers of the type described above. Poly-1,3-dioxepane is preferred on account of its rapid depolymerization under acid conditions.

Poly-1,3-dioxolane, poly-1,3-dioxane and poly-1,3-dioxepane can be prepared by processes similar to those for polyoxymethylene homopolymers and copolymers, so that further details are surperfluous here. The molecular weight is not crucial per se and lies in general within the same range as the molecular weight of the polyoxymethylene homopolymers or copolymers.

Under the conditions of compounding or injection molding, virtually no transacetalization occurs between the polyoxymethylene polymers B1) and B2); that is, virtually no exchange of comonomer units takes place.

Consequently, the crystallite melting point of component B1) is not reduced either; only the crystallization time is somewhat increased (which is desirable) and the crystalline content somewhat reduced. Since the crystallite melting point of the main component B1) is not reduced, the high heat distortion resistance is retained and the danger of warping on catalytic debindering is reduced.

The thermoplastic materials may also contain customary additives and processing aids which have a positive effect on the rheological properties of the mixtures during molding.

The mixtures of polyacetal binder and polymer powder can be prepared by mixing the components in customary mixing apparatus such as kneaders or extruders. In the case of blending in an extruder the mixture can be extruded and granulated.

For injection molding, a conventional screw or plunger injection molding machine can be employed. Molding generally takes place at from 170° to 220° C. and pressures of 3,000 to 20,000 kPa into molds maintained at from 80° to 150° C. Sheet and profile extrusion can be carried out using the customary apparatus.

The proportion of polymer powder within the thermoplastic material ranges from 45 to 70% by volume, preferably from 50 to 65% by volume. A proportion of this volume share may be occupied by stiffness increasing fillers such as glass fibers, carbon fibers or globular, mineral fillers, although the proportion thereof should not exceed 50% of the volume share due to the polymer powder.

To remove the binder, the structures obtained after molding are preferably treated with a gaseous acid-containing atmosphere in line with the process of earlier German Patent Applications P 39 29 869 and P 40 00 278.

This treatment takes place in the process of the present invention at 100°–150° C. over a period of from 0.1 to 50 h, preferably from 0.5 to 12 h.

Suitable acids for the treatment in this stage of the process of the present invention are inorganic acids which are already gaseous at room temperature or at least vaporizable at the treatment temperature. An example is $HNO_3$. Suitable organic acids are those which have a boiling point of less than 130° C. under atmospheric pressure, e.g. formic acid, acetic acid, trifluoroacetic acid or a mixture thereof.

Other suitable acids are $BF_3$ and $BF_3$ etherates. In general, the required treatment time depends on the treatment temperature and the concentration of the acid in the treatment atmosphere and also on the wall thickness of the molding.

If a carrier gas is used, it is generally passed beforehand through the acid to become laden therewith. The so laden carrier gas is then brought to the treatment temperature, which advantageously is higher than the laden temperature, to avoid condensation of the acid.

Preferably, the acid is mixed into the carrier gas via a metering means and the mixture is heated in order to avoid condensation of the acid.

The above-described treatment is carried out until the binder has been removed virtually completely. This is easily discernible from the weight loss.

To obtain tight moldings, they must be isostatically sintered under pressure. To this end they must be surrounded on all sides by a tight, formable envelope. Only in this way is it possible for pressure to act on the molding from all sides and for the molding to shrink isotropically during sintering.

There are various possible alternatives. The porous molding can be dipped into a lacquer which, after the solvent has evaporated, forms a firm plastic film. The viscosity of the lacquer must be sufficiently high for the lacquer not to penetrate into the molding. Preference is given to lacquers which consist of the polymer to be sintered and a solvent. This kind of related lacquer may also be allowed to penetrate into the porous molding.

Suitable coating materials also include those based on polydimethylsiloxanes, epoxy resins, unsaturated polyester resins, polyimide resins, polyamide-imide and polyester-imide resins. It is also possible to use solutions of high molecular weight thermoplastic polymers such as polystyrene, polystyrene/acrylonitrile copolymers, polycarbonate, polysulfone or polyether sulfone in low boiling solvents such as acetone, methyl ethyl ketone or dimethylformamide. Another possibility is to dip the porous moldings into aqueous polymer dispersions and to dry the dispersions to form polymer coats. It is advantageous here to heat the moldings to 100°–150° C. before dipping them or to do so immediately after debindering in order to achieve immediate coagulation of the dispersion at the surface and hence to avoid penetration of the dispersion into the pores. Of particular advantage are inexpensive dispersions based on styrene with from 2 to 10% by weight of butadiene. Films from these dispersions have a high temperature resistance and do not become too liquid at up to 300° C., since the butadiene content undergoes partial crosslinking and hence the film does not penetrate into the pores under pressure. It is also possible to use aqueous secondary dispersions based on more highly temperature resistant polymers such as polyester-imides or polyamide-imides for producing tight films on the porous moldings.

However, it is also possible to grind film-forming polymers such as polystyrene or polyether sulfone to particles having diameters of from 2 to 100 $\mu$m, dispersing these particles in water, and covering the porous moldings with such a slurry.

The grinding step can be eliminated by dissolving the polymers in a solvent and introducing the solvent into a nonsolvent and, by precipitating the polymer, preparing a slurry of polymer particles directly.

To produce films which are resistant at above 400° C., films based on inorganic glasses are applied. Such glasses contain increased proportions of lead oxide, borate and/or phosphate and hence have lower softening temperatures. The glasses are ground and suspended in water or an organic solvent. The moldings are dipped into the suspension, the water or solvent is evaporated, and the glass powder melts in the autoclave to form a tight envelope.

After the surface of the porous molding has been covered with the material for forming a tight film, the molding is introduced into an autoclave, heated therein to develop the tight film and then pressurized. After sintering, the autoclave is cooled down, the moldings are removed therefrom, and the usually only loosely adhering envelope is removed. The sintering conditions, temperature, pressure and residence time depend on the particular polymer to be sintered.

At sintering temperatures below 450° C. it is also possible to sinter within a liquid which gives a better heat transfer than gases. Moreover, the liquid pressure can easily be applied with a hydraulic machine. The liquid used is preferably an orthosalicic ester such as $Si(OC_8H_{17})_4$.

EXAMPLE

A twin-screw extruder having a screw diameter of 30 mm is charged at a rate of 6.0 kg/h with a polyoxymethylene which contains 6% by weight of butanediolformal as comonomer, and the polyoxymethylene is melted at 190° C. At a second, downstream opening a polyimide powder having an average particle diameter of 45 $\mu$m (type P84 from Lenzing) is metered into the polyoxymethylene melt at a rate of 7.4 kg/h. The polyimide powder is intimately mixed with the melt in two kneading blocks each 30 mm in length and 90 mm apart. The rate of addition was chosen in such a way that the polyoxymethylene-polyimide mixture contains 55% of polyimide by volume. The polyoxymethylene-polyimide mixture is extruded into a waterbath, cooled and granulated. After drying, the total quantity of granules is mixed in itself, melted once more by means of an extruder, mixed, extruded, cooled and dried in order to obtain a homogeneous mass which is free of measurable fluctuations in the composition due to fluctuations in the mass flow from the continuous metering scales.

The material thus obtained is injection molded at a melt temperature of 180° C. and a mold wall temperature of 120° C.

To remove the polyoxymethylene matrix, the injection molded specimens, having a wall thickness of not more than 4 mm, were placed in a drying cabinet fitted with a fan for recirculating the atmosphere. The drying cabinet was heated to 140° C. During the heating-up, the drying cabinet was purged with nitrogen in order to reduce the oxygen content of the atmosphere to below 2%. Then the approximately 30 l capacity drying cabinet was charged with 100% strength nitric acid at a rate of 15 ml/h. To this end, the inert gas stream of 200 l/h was heated to 140° C. and the nitric acid was metered into the hot inert gas stream, where it was immediately vaporized and entrained into the drying cabinet. After 2.5 h the addition of acid was terminated, and the drying cabinet was purged with inert gas only. After the 2.5 h acid treatment the moldings no longer contained any polyoxymethylene. They were therefore relatively fragile.

To render the moldings more stable for the application of a gas/liquid-tight envelope, the drying cabinet was heated to 300° C. for 2 h. This produced a presintering with a linear shrinkage of about 5%, making the molding sufficiently strong for application of the envelope.

This was done by preparing a solution of 25% by weight of a polyimide powder in dimethylacetamide as solvent. The moldings were briefly dipped into this solution and excess solution was allowed to drip off. After drying at room temperature the procedure was repeated. Following this treatment, the outer pores had been covered with the sa/ne polyimide, forming the necessary gas/liquid-tight envelope.

The moldings were introduced into an autoclave, and the autoclave was purged with nitrogen to remove the air and then heated to 350° C. After this temperature had been reached, the nitrogen pressure was raised to 200 bar and the autoclave was left at 350° C. and 200 bar for 1 hour. The autoclave was then cooled down and, after 30°–40° C. had been reached, the excess pressure was released.

The injection molded pieces had shrunk uniformly in their dimensions by 18%, corresponding to a volume shrinkage of 44%. Accordingly, the moldings still contained a residual porosity of about 1%. The following properties were measured: breaking strength 100 MPa and breaking extension 5%, measured in accordance with German standard specification DIN 53455.

We claim:

1. A process for the thermoplastic processing and sintering of an unplastifiable polymer, which comprises dispersing the unplastifiable polymer in powder form in a melt of a polyacetal or a mixture of polyacetals, cooling the resulting mixture, granulating it, forwarding the granules to a thermoplastic processing stage, injection or extrusion molding, exposing the molding to an atmosphere which contains an acidic gas, thereby depolymerizing the polyacetal, enveloping the remaining porous molding on all sides in a gas/liquid-impermeable film, heating in an autoclave, and isostatically sintering the molding with pressure from all sides to form the finished article.

2. The process of claim 1, wherein the polyacetal used is a polyoxymethylene which contains from 0 to 8% by weight of a comonomer.

3. The process of claim 1, wherein the polyacetal used is a mixture of
B1) from 70 to 90% by weight of a polyoxymethylene polymer with from 0 to 10 mol % of comonomer units and
B2) from 10 to 30% by weight of a polyoxymethylene copolymer having a comonomer content of from 20 to 99 mol %, 1,3-dioxolane, 1,3-dioxane or 1,3-dioxepane or a mixture thereof or homopolymeric poly-1,3-dioxane, poly-1,3-dioxolane or poly-1,3-dioxepane.

4. The process of claim 1, wherein the proportion of unplastifiable polymer powder in the material is from 45 to 70% by volume.

5. The process of claim 1, wherein the depolymerization of the polyacetal is carried out at from 100° to 150° C under atmospheric pressure over under the influence of an acid, preferably nitric acid, boron trifluoride or boron trifluoride etherate.

6. The process of claim 1, wherein the porous molding left behind after the polyacetal has been removed is coated on all sides with an impermeable formable film by spraying or dipping with an lacquer, a polymer solution, a crosslinkable polymer, an aqueous polymer dispersion or a slurry of an inorganic low melting glass.

7. The process of claim 1, wherein the molding coated with an impermeable film is isostatically sintered at from 180° to 800° C., at a pressure of from 1 to 2,000, bar.

8. The process of claim 1, wherein the proportion of unplastifiable polymer powder in the material is from 50 to 65% by volume.

9. The process of claim 5, wherein the depolymerization of the polyacetal is carried out over a period of from 0.5 to 12 h.

10. The process of claim 1, wherein the molding coated with a impermeable film is isostatically sintered at from 220° to 700° C. at a pressure of from 10 to 400 bar.

* * * * *

UNITED STATES PATENT AND TRADEMARK OFFICE
CERTIFICATE OF CORRECTION

PATENT NO. : 5,342,561
DATED : August 30, 1994
INVENTOR(S) : STERZEL et al.

It is certified that error appears in the above-indentified patent and that said Letters Patent is hereby corrected as shown below:

Claim 5, column 8, line 22:
   after "over" insert -- a period of from 0.1 to 50 h, --

Signed and Sealed this

Twentieth Day of December, 1994

Attest:

BRUCE LEHMAN

*Attesting Officer*   *Commissioner of Patents and Trademarks*